US007986534B2

(12) United States Patent
Chae et al.

(10) Patent No.: US 7,986,534 B2
(45) Date of Patent: Jul. 26, 2011

(54) APPARATUS TO GENERATE HIGH VOLTAGE BY DIGITAL CONTROL AND METHOD THEREOF

(75) Inventors: Young-min Chae, Suwon-si (KR); Joong-gi Kwon, Gunpo-si (KR); Chul-woo Oh, Suwon-si (KR); Jong-hwa Cho, Suwon-si (KR); Sang-yong Han, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 124 days.

(21) Appl. No.: 12/353,415

(22) Filed: Jan. 14, 2009

(65) Prior Publication Data

US 2009/0129809 A1 May 21, 2009

Related U.S. Application Data

(62) Division of application No. 11/365,670, filed on Mar. 2, 2006, now Pat. No. 7,508,095.

(30) Foreign Application Priority Data

Mar. 23, 2005 (KR) ................................ 2005-024139
Oct. 25, 2005 (KR) ................................ 2005-100705

(51) Int. Cl.
*H02M 3/335* (2006.01)
*G03G 15/00* (2006.01)

(52) U.S. Cl. ........................................... 363/16; 399/88

(58) Field of Classification Search .................... 363/16, 363/20, 21.01, 21.04, 21.05, 21.09, 21.1; 399/37, 88, 90; 307/129–131
See application file for complete search history.

(56) References Cited

U.S. PATENT DOCUMENTS

| | | | | |
|---|---|---|---|---|
| 5,552,861 | A * | 9/1996 | Mizude et al. | 399/50 |
| 5,612,857 | A * | 3/1997 | Ishikawa | 363/21.02 |
| 5,734,564 | A | 3/1998 | Brkovic | |
| 7,289,745 | B2 * | 10/2007 | Nara et al. | 399/88 |
| 2004/0000897 | A1 | 1/2004 | Asayama | |
| 2004/0228049 | A1 | 11/2004 | Chae et al. | |

FOREIGN PATENT DOCUMENTS

| | | |
|---|---|---|
| EP | 0989662 | 3/2000 |
| JP | 62-236361 | 10/1987 |
| JP | 01-114366 | 5/1989 |
| JP | 02-070266 | 3/1990 |

(Continued)

OTHER PUBLICATIONS

Japanese Office Action issued Feb. 3, 2009 in JP Patent Application No. 2006-81110.

(Continued)

*Primary Examiner* — Matthew V Nguyen
(74) *Attorney, Agent, or Firm* — Stanzione & Kim, LLP

(57) ABSTRACT

An apparatus to generate a high voltage includes a switching part to control a voltage induced in a secondary coil of a power transforming part, by interrupting a current in a primary coil of the power transforming part, a digital controlling part to control the interruption operation of the switching part according to supplied control data. The switching part, the digital interfacing part and the digital controlling part may be embodied in an ASIC chip (application-specific integrated circuit). An optimum control according to an output state of the apparatus is easily achieved, manufacturing time for tuning each parameter is reduced and heat generation in the apparatus is reduced.

3 Claims, 5 Drawing Sheets

FOREIGN PATENT DOCUMENTS

| | | |
|---|---|---|
| JP | 03-135368 | 6/1991 |
| JP | 6022549 | 1/1994 |
| JP | 06-165485 | 6/1994 |
| JP | 07-020953 | 1/1995 |
| JP | 07-241083 | 9/1995 |
| JP | 7-322615 | 12/1995 |
| JP | 10-243651 | 9/1998 |
| JP | 2000-32753 | 1/2000 |
| JP | 2002199719 | 7/2002 |
| JP | 2003-033021 | 1/2003 |
| JP | 2004-037635 | 2/2004 |
| JP | 2004-145341 | 5/2004 |
| KR | 1990-10741 | 6/1990 |
| KR | 1994-702335 | 7/1994 |
| KR | 2000-7563 | 2/2000 |

OTHER PUBLICATIONS

Japanese Notice of Allowance issued Apr. 20, 2010 in JP Application No. 2006-081110.

European Search Report issued Jul. 27, 2009 in EP Application No. 06111414.6.

* cited by examiner

APPARATUS TO GENERATE HIGH VOLTAGE BY DIGITAL CONTROL AND METHOD THEREOF

CROSS-REFERENCE TO RELATED APPLICATIONS

This application is a divisional of prior application Ser. No. 11/365,670, filed Mar. 2, 2006, now U.S. Pat. No. 7,508,095 in the U.S. Patent and Trademark Office, now pending, which claims benefit under 35 U.S.C. §119(a) of Korean Patent Application No. 2005-24139 filed on Mar. 23, 2005, and Korean Patent Application No. 2005-100705, filed on Oct. 25, 2005, in the Korean Intellectual Property Office, the entire contents of which are incorporated herein by reference.

BACKGROUND OF THE INVENTION

1. Field of the Invention

The present general inventive concept relates to an apparatus to generate high voltage and a method thereof. More particularly, the present general inventive concept relates to an apparatus to generate high voltage by digital control using an application-specific integrated circuit (ASIC) on a control part and a digital control method thereof to control output stabilization and various output.

2. Description of the Related Art

An image forming apparatus prints an image corresponding to an original image data input on a recording medium, such as a printing paper. The image forming apparatus includes a printer, a copy machine or a facsimile. An electro-photographic method is employed in the image forming apparatus, such as a laser beam printer, an LED Print Head (LPH) printer, and a facsimile. The image forming apparatus using the electro-photographic method performs printing through charge, exposure, development, transfer and fixation steps.

FIG. 1 schematically illustrates a conventional image forming apparatus using an electro-photographic method. Referring to FIG. 1, the image forming apparatus using the electro-photographic method includes a photoconductive drum 1, a charge roller 2, a laser scanning unit (LSU) 3, a development roller 4, a transfer roller 5, a controlling part 6 and a High Voltage Power Supply (HVPS) 70.

The conventional image forming apparatus using the electro-photographic method performs printing steps as follows. The HVPS 70 supplies a predetermined voltage to the charge roller 2, the development roller 4, and the transfer roller 5 according to control by the controlling part 6. The charge roller 2 evenly electrifies a surface of the photoconductive drum 1 with a charge voltage supplied from the HVPS 70. The LSU 3 scans light (e.g., laser beam) corresponding to an image data input from the controlling part 6 to the photoconductive drum 1. Accordingly, an electrostatic latent image is formed on the surface of the photoconductive drum 1. A toner image is formed based on the electrostatic latent image formed on the surface of the photoconductive drum 1, using toner supplied by the development roller 4. The transfer roller 5 is driven by a transfer voltage supplied from the HVPS 70 and transfers the toner image formed on the photoconductive drum 1 to a recording paper. The toner image transferred to the recording paper is fixed on the printing paper by high heat and pressure of a fixer (not shown), and the printing paper is ejected to an outside of the conventional image forming apparatus in an ejection direction (not shown).

As a key part of the image forming apparatus, such as a copy machine, a laser beam printer or a facsimile, the HVPS 70 supplies voltage by instantaneously converting a low voltage of 12~24V to a high voltage of hundreds or thousands volts and charging the drum of the image forming apparatus. The HVPS 70 is used as a constant voltage or current source to provide a required voltage or current.

FIG. 2 is a circuit diagram illustrating a conventional HVPS. Referring to FIG. 2, the conventional HVPS includes a low pass filtering part 10, a voltage controlling part 20, an oscillator and power transforming part 30, a voltage dividing part 40, a voltage sensing part 50 and a protecting part 60. When the low pass filtering part 10 receives an input signal D(t) that is a PWM (Pulse Width Modulation) signal from an external engine controller, a level of an output voltage is decided according to a duty ratio, and the low pass filtering part 10 converts the input signal D(t) into a DC signal through an RC 2-step filter having resistors $R_1$, $R_2$, $R_{15}$ and capacitors $C_1$ and $C_{10}$. The DC signal is used as a reference signal to control an output voltage of the HVPS 70.

The voltage controlling part 20 is operated as a controller having a difference circuit $IC_1$ in parallel to a resistor $R_3$ and a capacitor $C_2$ to amplify an error signal, and compares the DC signal output by the low pass filtering part 10 and a signal having an actual voltage fed-back signal, to generate a driving signal of a transistor Q of the oscillator and power transforming part 30. The oscillator and power transforming part 30 controls a base current of the transistor Q based on the driving signal $V_{T1}$ supplied by the voltage controlling part 20 through the resistors $R_4$ and $R_5$, and voltages between an emitter connected between $R_4$ and $R_5$ connected through a capacitor $C_3$ and a collector of the transistor Q change using a voltage $V_{cc}$. Accordingly, a voltage $V_{T2}$ of a first (primary) coil $N_2$ of a voltage transforming part is determined, and a second voltage is induced in a second (secondary) coil $N_3$ of the voltage transforming part having a high turn ratio.

The voltage dividing part 40 uses diodes $D_1$ and $D_2$ to rectify the secondary voltage and capacitors $C_4$ and $C_5$ to distribute and smooth the rectified voltage, and generates a final DC high voltage from an AC voltage (i.e., the secondary voltage) induced in the second (secondary) coil of the oscillator and power transforming part 30. The voltage sensing part 50 includes the resistors $R_{16}$, $R_8$, and $R_7$ an integrated circuit $IC_2$ in parallel with an RC filter made of a resistor $R_{10}$ and a capacitor $C_7$. The voltage sensing part 50 is connected to the protecting part 60 through resistors $R_{11}$, and $R_{12}$ and capacitor $C_8$, and the protecting part 60 includes an integrated circuit $IC_2$, diodes $D_3$ and $D_4$, and resistors $R_{15}$, and $R_{13}$. The voltage sensing part 50 and the protecting part 60 detect the final DC high voltage actually output, generate a feedback signal to the voltage controlling part 20 and prevent supplying an abnormal voltage.

The conventional HVPS illustrated in FIG. 2 is a circuit generating a high voltage to a development unit of one particular channel, and requires respective channels for supplying a predetermined high voltage to the charge roller 2, the development roller 4, and the transfer roller 5.

The conventional HVPS uses an analogue control method for individually and precisely controlling an output of each channel, and accordingly, errors caused by characteristic deflection between the low pass (RC) filter 10 and the voltage controlling part 20 should be corrected. The use of many components is a hindrance to cost-savings and the conventional HVPS may operate erroneously due to defective unit parts as a result of external factors. The transistor Q is used as switching device of the oscillator and the voltage transforming part 30 and always operates in a linear area, such that the transistor continuously generates heat. As illustrated in FIG. 2, the conventional HVPS uses many components, accordingly increasing manufacturing time during an assembly process, and requiring Printed Circuit Board (PCB) space for disposing the many components.

SUMMARY OF THE INVENTION

The present general inventive concept provides an apparatus to generate a high voltage and a method thereof using one ASIC-chip to control the high voltage, and a digital control method thereof.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing an apparatus to generate a high voltage the apparatus comprising a switching part to control a voltage induced in a secondary coil of a power transforming part, by interrupting a current in a primary coil of the power transforming part, a digital controlling part to control the interruption operation of the switching part according to control data. The apparatus to generate high voltage may further comprise a digital interfacing part to provide the control data supplied from an external device to the digital controlling part, according to a predetermined method of communication interfacing with the external device.

The switching part, the digital interfacing part and the digital controlling part may be disposed in one chip.

The digital interfacing part may convert the control data from a PWM (Pulse Width Modulation) form into a digital form and may provide the converted control data to the digital controlling part.

The digital controlling part may receive a second output voltage fed back from the power transforming part as a feedback signal and may modulate a cycle of the interruption operation of the switching part according to the feedback signal. The digital controlling part may comprise a frequency modulating part to generate a synchronize signal corresponding to a moment when the switching part requires a minimized resonance voltage to perform the interruption operation, and a voltage modulating part to modulate a cycle of the interruption operation of the switching part, according to comparison results of a reference voltage determined based on a feedback signal corresponding to the second output voltage of the power transforming part, and the control data, and to perform the interruption operation corresponding to the synchronize signal.

The predetermined method may be one of a SPI (Serial Peripheral Interface), a UART (Universal Asynchronous Receiver/Transmitter) and an $I^2C$ bus. The switching part may use a MOSFET (Metal Oxide Semiconductor Field Effect Transistor) as a switching device to perform the interruption operation.

The foregoing and/or other aspects of the present general inventive concept may also be achieved by providing image forming apparatus including a switching part to control a voltage induced in a secondary coil of a power transforming part, by interrupting a current in a primary coil of the power transforming part, and a digital controlling part to control the interruption operation of the switching part according to supplied control data.

The foregoing and/or other aspects of the present general inventive concept are also achieved by providing a method of generating high voltage, the method including receiving control data through a predetermined method of communication interface, controlling a switching operation of a predetermined switching device, according to the received control data to interrupt current supplied to a primary coil of a power transforming part, and modulating a voltage induced in a secondary coil of the power transforming part by interrupting the current in the primary coil of the power transforming part according to the switching operation.

The method of generating high voltage may further comprise receiving a feedback signal from the power transforming part, and modulating a cycle of the switching operation according to the feedback signal.

The method may further comprise supplying the induced voltage to an image forming unit of an image forming apparatus.

The method may be performed in an ASIC (application-specific integrated circuit) chip.

The foregoing and/or other aspects of the present general inventive concept may also be achieved by providing an ASIC chip provided on one semiconductor substrate and comprising a switching device to control a voltage induced in a secondary coil of a power transforming part, by interrupting a current in a primary coil of the power transforming part, a digital interfacing part to provide a predetermined communication interface to receive the control data supplied from an external device, and a digital controlling part to control an interruption operation of the switching part according to supplied control data. The ASIC chip may further comprise a feedback circuit part to receive a second output voltage of the power transforming part and to modulate a cycle of the interruption operation of the switching part according to the second output voltage.

The foregoing and/or other aspects of the present general inventive concept may also be achieved by providing an image forming apparatus comprising an image forming unit, a voltage outputting part having a primary coil and secondary coil to supply a voltage to the image forming part, and a single monolithic chip to receive control data from at least one of the image forming unit and the voltage outputting part, to interrupt a current supplied to the primary coil according to the control data, and to generate the voltage with the interrupted current in the secondary coil.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 5 is a view illustrating changes of an inter-drain source voltages as the time goes by.

DETAILED DESCRIPTION OF THE PREFERRED EMBODIMENTS

Figure 1:
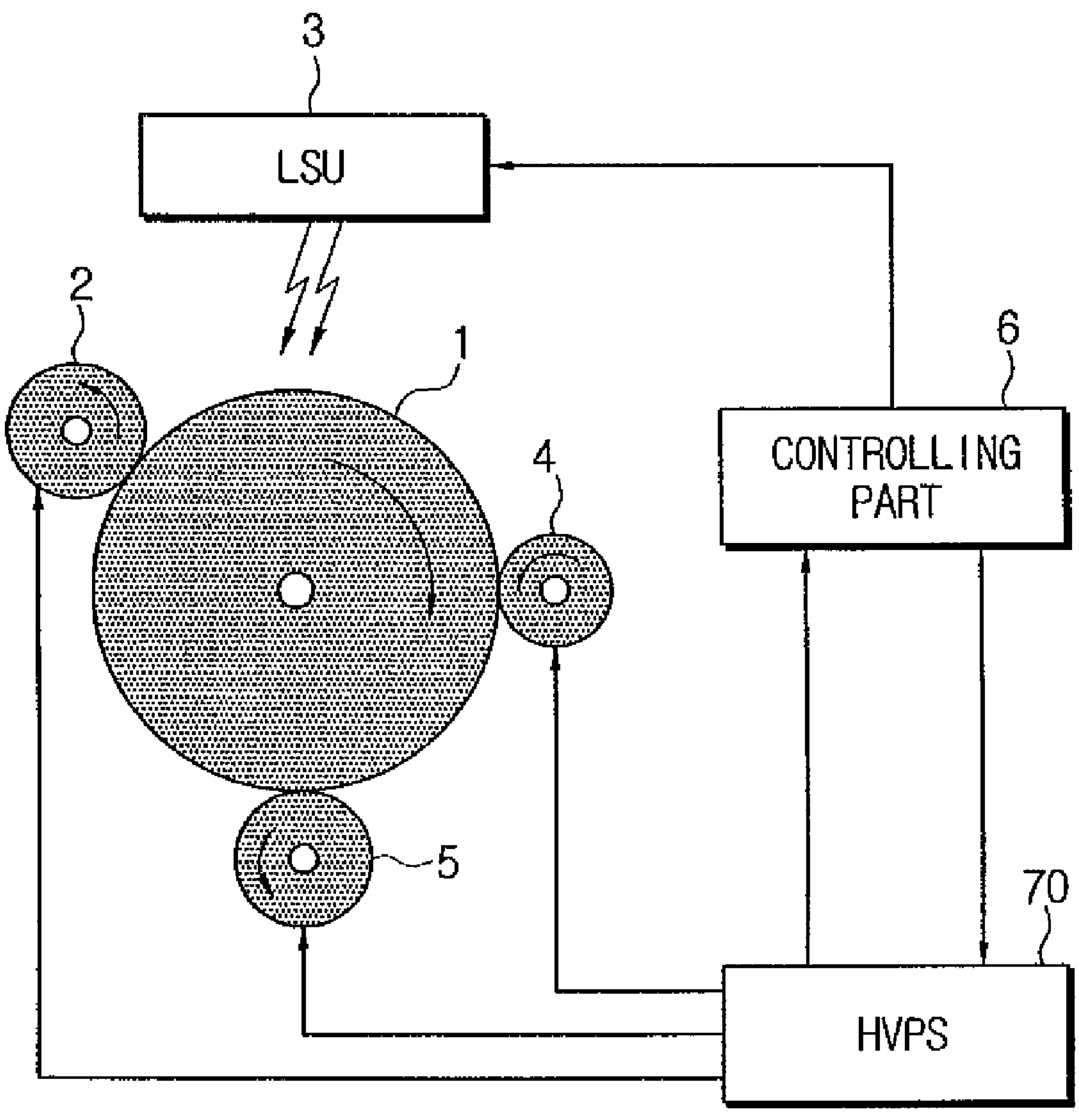
FIG. 1 (PRIOR ART)
FIG. 1 is a schematic view illustrating a conventional image forming apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

An apparatus to generate a high voltage according to an embodiment of the present general inventive concept includes a combination of various analog devices and an ASIC chip based on a digital control to control a first coil of a power transforming part. The ASIC chip can drive four channels according to an embodiment of the present general inventive concept.

Figure 3:
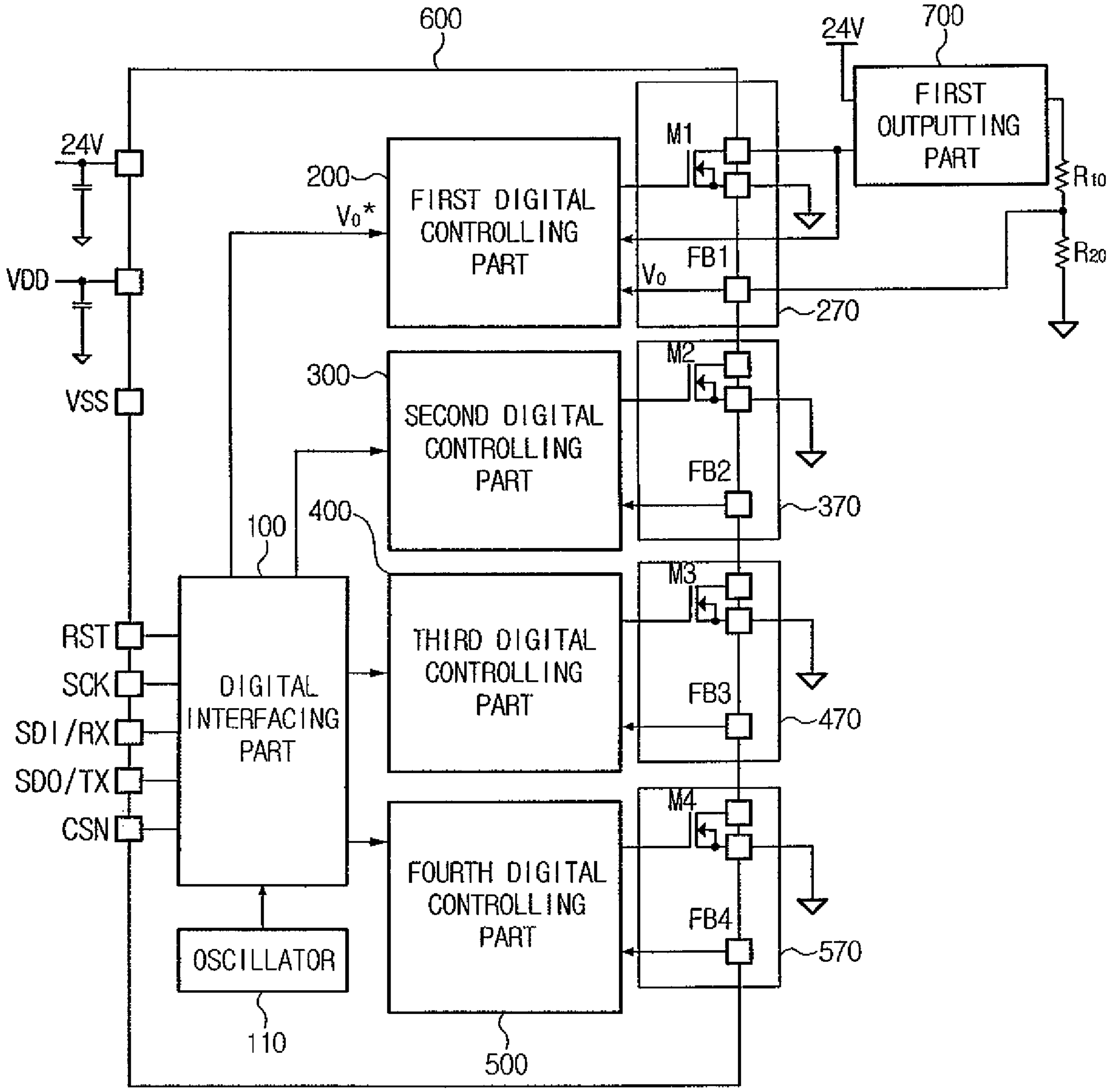
FIG. 3 is a block diagram illustrating an apparatus to generate a high voltage according to an embodiment of the present general inventive concept.

FIG. 3 is a block diagram illustrating an apparatus to generate a high voltage according to an embodiment of the present general inventive concept. Referring to FIG. 3, the apparatus to generate the high voltage has a semiconductor chip or an integrated circuit chip, such as an ASIC chip 600. The apparatus of FIG. 3 can be used in an HVPS 70 of an image forming apparatus of FIG. 1. The high voltage generated from the apparatus of FIG. 3 can be used to charge an image forming unit, such as a drum 1, a developer roller 4 and a transfer roller 5 of FIG. 1. The ASIC chip 600 includes a digital interfacing part 100, an oscillator 110, first through fourth digital controlling parts 200, 300, 400 and 500, and first through fourth switching parts 270, 370, 470 and 570, and first through fourth outputting parts 700 each having a power transforming part, a power dividing part, and a rectifying part. The first through fourth switching parts 270, 370, 470 and 570 are each connected to an outputting part provided with the power transforming part and the power dividing part, respectively. FIG. 3 illustrates the first outputting part 700 connected to the first switching part 270 for convenience. The second, third, and fourth outputting parts can be connected to the second, third, fourth switching parts 370, 470 and 570, respectively.

The digital interfacing part 100 receives control data to determine a level of an output voltage from an external engine controlling part of the image forming apparatus by various methods of communication interfacing, through terminals RST, SCK, SDI/RX, SDO/RX, SDO/TX, CSN and the like. The various methods of communication interfacing include a conventional reception of a Pulse Width Modulation (PWM) signal having the level of the output voltage decided by a duty ratio, an Universal Asynchronous Receiver/Transmitter (UART), a Serial Peripheral Interface (SPI), which enables exchanges of data between two apparatuses in serial communication, and $I^2C$ which is a two-way serial bus.

The digital interfacing part 100 converts the control data input from the external engine controlling part into a predetermined format and transmits the converted control data to the first through fourth digital controlling parts 200, 300, 400 and 500, to be used as a control reference value (Vo*).

The first through fourth digital controlling parts 200, 300, 400 and 500 may have similar structure and function. The control reference value (Vo*) transmitted from the digital interfacing part 100 is compared with a signal (Vo) having an actual output voltage of each channel detected and fed back from the first outputting part 700. The result of the comparison is used as a driving signal of the switching device corresponding to the first through fourth switching parts 270, 370, 470 and 570.

The ASIC chip 600 may include the first through fourth switching parts 270, 370, 470 and 570 each using a MOSFET (M1, M2, M3, M4) a the switching device. The first through fourth switching parts 270, 370, 470 and 570 provide a controlled voltage to a first coil (primary coil) of the power transforming part serially connected to a drain of the MOSFET, by supplying the driving signal output by the first through fourth digital controlling parts 200, 300, 400 and 500, to a gate of the MOSFET. Since the MOSFET is used as a switching device, a heat sink to dissipate heat generated by the transistor is not necessary in the present embodiment.

The power transforming part of the first outputting part 700 is serially connected to the switching device 270, and resonates according to an on and off operation of the switching device 270, to generate an AC signal which may be used to control components of an image forming apparatus. Accordingly, a second coil (secondary coil) of the power transforming part is induced with the AC signal (or AC voltage) having a high electric potential. The power dividing part and the rectifying part rectify the AC voltage induced in the second coil of the power transforming part according to a range of an output voltage, or boost the AC voltage through a distributing circuit. The rectified and/or boosted AC voltage is used as a final output voltage to control the components of the image forming apparatus. The present embodiment is not limited to supplying power to components of the image forming apparatus. The ASIC chip 600 is provided with the oscillator 110, which is a clock generator, and is supplied with a 24V voltage as a power for high voltage supply, and another voltage VDD as a power for driving integrated circuits, such as the ASIC chip 600.

The outputting part 700 of each channel is controlled according to the control data transmitted by the external engine controlling part, such that a high voltage is generated.

Figure 4:
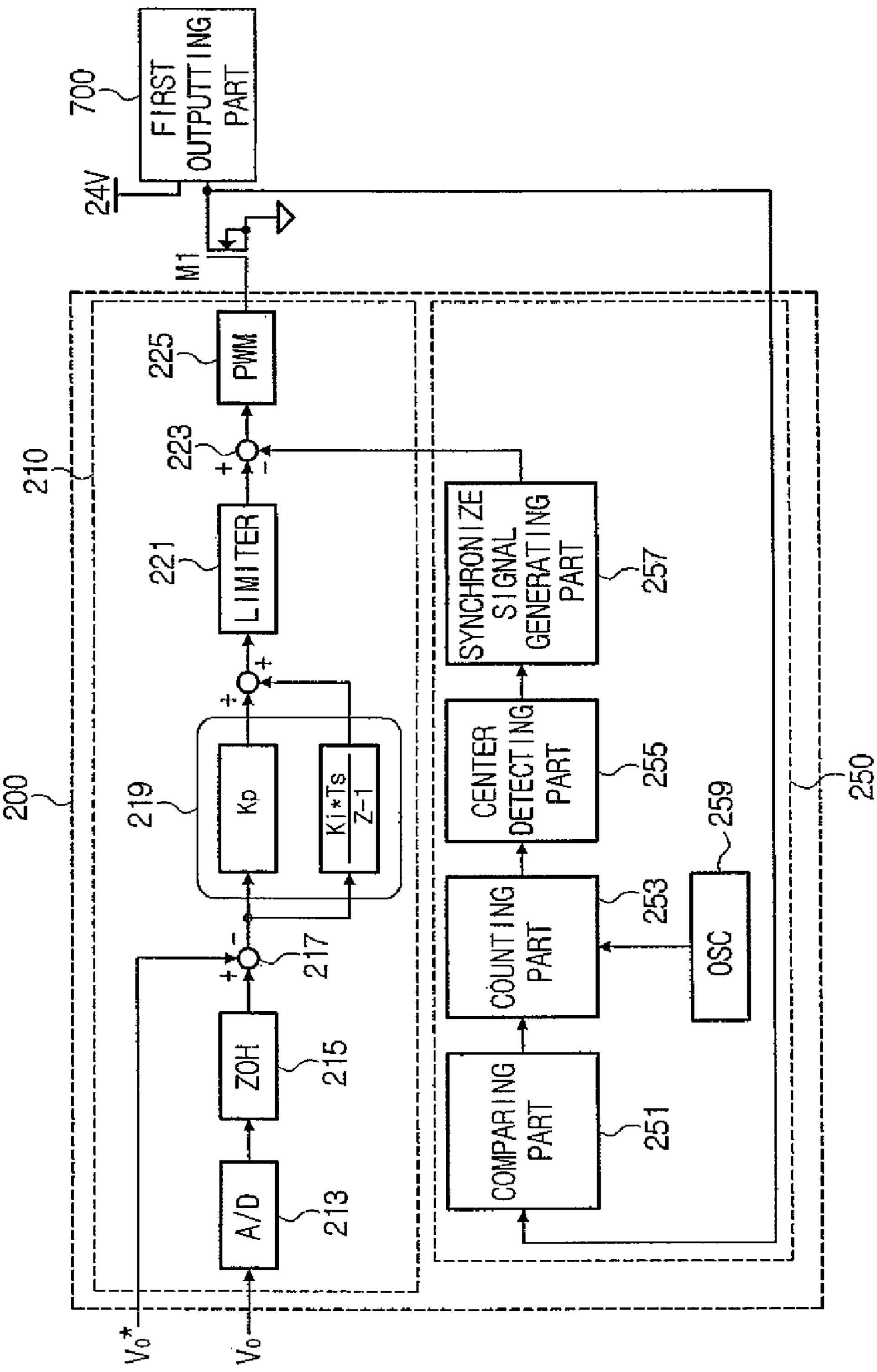
FIG. 4 is a block diagram illustrating a digital controlling part of the apparatus of FIG. 3.

FIG. 4 is a block diagram illustrating the first digital controlling part 200 of the apparatus of FIG. 3. Referring to FIGS. 3 and 4, the first digital controlling part 200 has a power controlling part 210 and a frequency modulating part 250. The power controlling part 210 includes an analog to digital converter (A/D) 213, zero order hold circuit (ZOH) 215, a first calculating part 217, a proportional-integral (PI) controller 219 using a constant and/or a variable Kp and/or (Ki*Ts)/Z−1, a limiter 221, a second calculator 223, and a Pulse Width Modulation (PWM) circuit 225. The frequency modulating part 250 comprises a comparing part 251, a counting part 253, a center detecting part 255, a synchronize signal generating part 257, and an oscillator clock (QSC) 259.

The A/D 213 of the power controlling part 210 converts the signal Vo having the actual output voltage fed back into a digital signal. The ZOH 215 maintains a value of the converted digital signal until a next sampling cycle of the A/D 213

The first calculating part 217 transmits a difference between the control reference value (Vo*) transmitted from the digital interfacing part 100 (see FIG. 3) and a signal output from the ZOH 215, to the PI controlling part 219.

Figure 5:
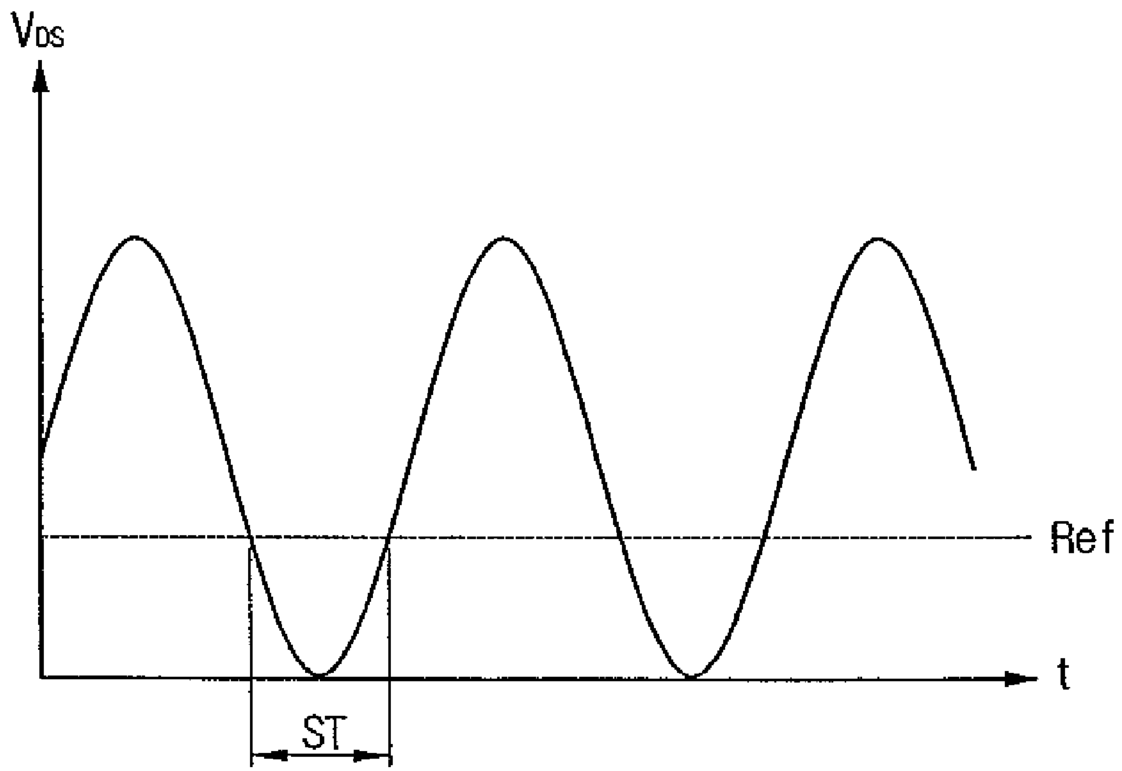

The comparing part 251 of the frequency modulating part 250 receives an inter-drain source voltage of the MOSFET M1 used as the switching device as a feedback signal FB1. Similarly, inter-drain source voltages of the MOSFETs M2, M3, and M4, are used as feedback signals FB2, FB3, and FB4, respectively. As illustrated in FIG. 5, a zero crossing state is detected with respect to a predetermined reference value Ref, as a result of comparing the feedback signal FB1 and the predetermined reference value Ref. When the zero crossing state is detected (that is, Ref is equal to the feedback signal), the counting part 253 receives a clock signal from the OSC 259, to count. The counting part 253 counts a time interval ST from a detection point of the zero crossing state received from the comparing part 251 to a detection point of a next zero crossing state. According to the result of counting by the counting part 253, the center detecting part 255 determines an intermediary (center) point between detection points of the zero crossing state, and the detected intermediary point within the time interval ST is substantially a moment when the inter-drain source voltage of MOSFET M1 is minimized. The center detecting part 255 transmits the intermediary point (moment) to the synchronize signal generating part 257 and accordingly, the synchronize signal generating part 257 generates a synchronize signal which is an optimum switching time to have a minimal inter-drain source voltage of MOSFET M1, and thereby minimizing a power loss.

An output signal of the PI controlling part 219 is compared with the synchronize signal output from the frequency modulating part 250, through the limiter 221 that limits a level of an output signal to a predetermined range, such that a PWM form of a gate signal is generated to be supplied to a gate end of the MOSFET M1. As illustrated in FIG. 5, the generated PWM form of the gate signal causes a switching operation of the MOSFET M1 in the vicinity of a point or the moment when the inter-drain source voltage is minimized (ST), according to the synchronize signal output by the synchronize signal generating part 257, and the power loss during the switching operation is minimized.

The structure and function of the second through fourth digital controlling parts 300, 400, and 500 are similar to the above-described first digital controlling part 200.

Figure 2:
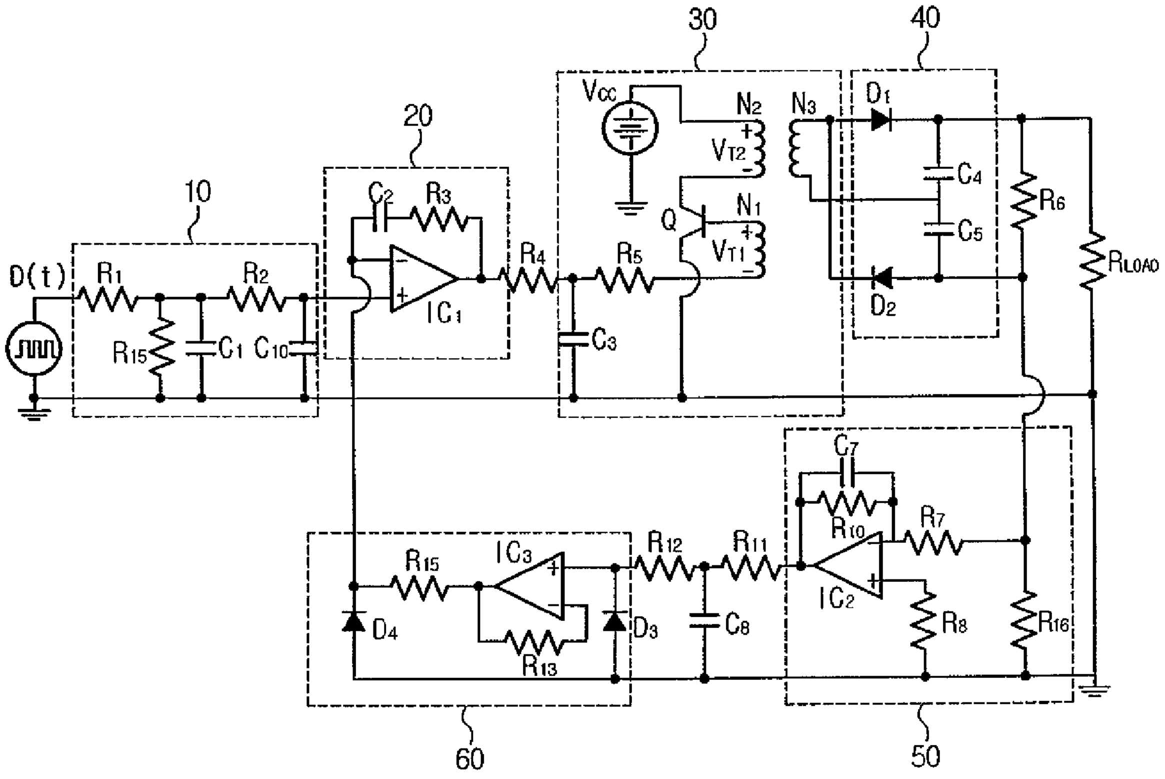
FIG. 2 (PRIOR ART)
FIG. 2 is a circuit block diagram illustrating a conventional apparatus of generating a high voltage.

In each of the digital controlling parts 200, 300, 400 and 500 may be embodied a structure to perform a voltage control function including an RC filter and operational amplifier the structure being similar to the voltage controlling part 20 used in the conventional apparatus for generating high voltage of FIG. 2. The embodied structures enables the ASIC chip 600 to actively cope with variance of load connected to any of the first through fourth outputting parts 700. The entire structure of the apparatus to generate high voltage may be further simplified by including the switching devices in ASIC chip.

Because one ASIC chip enables to output four or more channels, multi-output may be possible by using a plurality of ASIC chips in image forming apparatuses, for example a Mono LBP and a Tandem C-LBP.

As above described, according to various embodiments of the present general inventive concept, it is enabled part savings and compactness of the apparatus to generate a high voltage usable with an image forming apparatus, by having one ASIC chip and using a digital control method. Functionality of the image forming apparatus is expanded by using control data transmitted by various methods of communication interfacing such as SPI, UART or $I^2C$, as a control reference value.

By controlling a variable value, such as a proportional gain used for the digital controlling part in the ASIC chip, embodiments of the apparatus to generate a high voltage achieve an easy optimum control according to output state and more flexibility. The efficiency of mass production is increased by reducing the time needed for tuning each parameter and by including the MOSFET used as a switching device in the ASIC chips, heat-generation problems of the conventional HVPS are overcome.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:

an image forming unit;

a voltage outputting part having a primary coil and secondary coil to supply a voltage to the image forming part; and a single monolithic chip to receive control data from at least one of the image forming unit and the voltage outputting part, to interrupt a current supplied to the primary coil according to the control data, and to generate the voltage with the interrupted current in the secondary coil, the monolithic chip including:

a digital interfacing part to receive the control data and to provide a reference voltage value according to the received control data; and at least one high voltage channel to output the voltage, the at least one high voltage channel comprising:

a digital controlling part to receive the reference voltage value from the digital interfacing part and a feedback voltage from the voltage outputting part, and to output a driving signal according to a comparison between the received reference voltage value and the feedback voltage; and a switching part to receive the driving signal from the digital controlling part and to interrupt the current supplied to the primary coil according to the driving signal.

2. The apparatus as claimed in claim 1, wherein the digital controlling part comprises:

a frequency modulating part to generate a synchronize signal when a power loss of the switching part is close to minimum; and a power controlling part to receive the reference voltage value from the digital interfacing part and the feedback voltage, and to output the driving signal when receiving the synchronize signal from the frequency modulating part.

3. A method controlling voltage in an image forming apparatus, the method comprising:

receiving control data from at least one of an image forming unit and a voltage outputting part having a primary coil and secondary coil to supply a voltage to the image forming part;

receiving a reference voltage value from an interfacing part of the image forming apparatus and a feedback voltage from a voltage outputting part;

outputting a driving signal according to a comparison with a comparator between the received reference voltage value and a feedback voltage from the voltage outputting part;

interrupting a current supplied to the primary coil according to the control data and the driving signal; and generating the voltage with the voltage outputting part with the interrupted current in the secondary coil.

* * * * *